(12) United States Patent
Kang

(10) Patent No.: US 9,304,855 B2
(45) Date of Patent: Apr. 5, 2016

(54) DATA STORAGE DEVICE

(71) Applicant: SK hynix Inc., Gyeonggi-do (KR)

(72) Inventor: Won Kyung Kang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 183 days.

(21) Appl. No.: 14/156,215

(22) Filed: Jan. 15, 2014

(65) Prior Publication Data

US 2015/0113355 A1    Apr. 23, 2015

(30) Foreign Application Priority Data

Oct. 18, 2013   (KR) .................. 10-2013-0124737

(51) Int. Cl.
  *G11C 29/00* (2006.01)
  *G06F 11/10* (2006.01)
(52) U.S. Cl.
  CPC .................. *G06F 11/1048* (2013.01)
(58) Field of Classification Search
  CPC ............ G06F 11/1008; G06F 11/1044; G06F 11/1076; G06F 3/0614; G06F 3/0689; G06F 3/0688; G06F 3/0659; G06F 11/1068; G06F 12/0246; G06F 2212/7203; G11C 7/24; G11C 11/406; G11C 16/102
  See application file for complete search history.

(56) References Cited

U.S. PATENT DOCUMENTS

| 4,758,992 A * | 7/1988 | Taguchi | G06F 11/1008 365/201 |
| 2006/0184856 A1 * | 8/2006 | Suzuki | G06F 11/1044 714/758 |
| 2006/0280019 A1 | 12/2006 | Burton et al. | |
| 2007/0226401 A1 * | 9/2007 | Huang | G06F 11/1068 711/103 |
| 2007/0234142 A1 * | 10/2007 | Aizawa | G06F 11/1076 714/718 |
| 2013/0019062 A1 * | 1/2013 | Bennett | G06F 3/0614 711/114 |

* cited by examiner

*Primary Examiner* — Guerrier Merant
(74) *Attorney, Agent, or Firm* — IP & T Group LLP

(57) ABSTRACT

A data storage device includes a nonvolatile memory device, an error correction code unit suitable for detecting and correcting a data error read from the nonvolatile memory device in response to an operation clock, and a clock unit suitable for selectively providing the operation clock to the error correction code unit depending on whether the data is read from the nonvolatile memory device or not.

18 Claims, 8 Drawing Sheets

DATA STORAGE DEVICE

CROSS-REFERENCES TO RELATED APPLICATION

The present application claims priority under 35 U.S.C. §119(a) to Korean application number 10-2013-0124737, filed on Oct. 18, 2013, in the Korean Intellectual Property Office, which is incorporated herein by reference in its entirety.

BACKGROUND

1. Technical Field

Various embodiments relate to a data storage device, and more particularly, to a data storage device including a nonvolatile memory capable of controlling power consumption based on the operating state of the nonvolatile memory device.

2. Related Art

The paradigm for the computer environment has shifted into ubiquitous computing so that computer systems can be used anytime and anywhere. As a result, the use of portable electronic devices such as mobile phones, digital cameras, and laptop computers has rapidly increased. In general, such portable electronic devices use a data storage device which uses a memory device.

Since a data storage device using a memory device does not have any mechanical driving part, it has excellent stability and durability, high information access speed, and low power consumption. Data storage devices with such properties include a USB (universal serial bus) memory device, a UFS (universal flash storage) device, a memory card having various interfaces, and a solid state drive (SSD).

SUMMARY

Exemplary embodiments of the present disclosure are provided to a data storage device capable of controlling power consumption.

In an exemplary embodiment of the present disclosure, a data storage device includes a nonvolatile memory device, an error correction code unit suitable for detecting and correcting a data error read from the nonvolatile memory device in response to an operation clock, and a clock unit suitable for selectively providing the operation clock to the error correction code unit depending on whether the data is read from the nonvolatile memory device or not.

The clock unit may provide the operation clock to the error correction code unit while a read operation for reading data stored in the nonvolatile memory device is performed.

The clock unit may block the providing of the operation clock to the error correction code unit while operations other than the read operation are performed.

In another exemplary embodiment of the present disclosure, a data storage device includes a nonvolatile memory device, an error correction code unit suitable for detecting and correcting a data error read from the nonvolatile memory device in response to a first operation clock, a memory interface suitable for providing control signals for controlling the nonvolatile memory device to the nonvolatile memory device in response to a second operation clock, and a clock unit suitable for selectively providing the first and second operation clocks to the error correction code unit and the memory interface depending on an operating state of the nonvolatile memory device.

In further exemplary embodiment of the present disclosure, a memory system includes a memory device suitable for storing data, a controller suitable for providing control signals for controlling the memory device thereto, and detecting and correcting the data of the memory device using an operation clock, wherein the operation clock is selectively generated depending on an operation state of the memory device.

According to the exemplary embodiments of the present invention, the data storage device including a nonvolatile memory device may control power consumption based on the operating state of the nonvolatile memory device.

BRIEF DESCRIPTION OF THE DRAWINGS

Features, aspects, and embodiments are described in conjunction with the attached drawings, in which.

DETAILED DESCRIPTION

Figure 1:
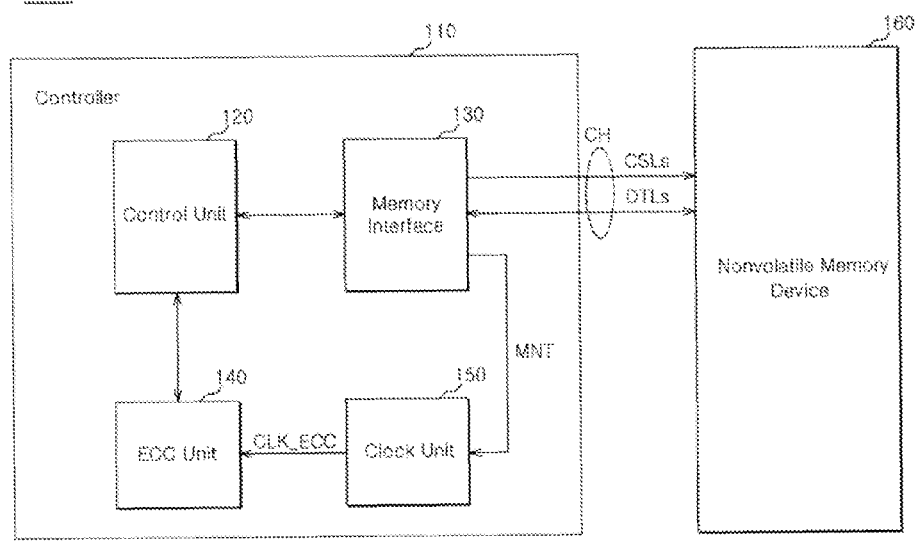
FIG. 1 is a block diagram exemplarily showing a data storage device in accordance with an embodiment of the present disclosure.

In the present disclosure, advantages, features and methods for achieving them will become more apparent after a reading of the following exemplary embodiments taken in conjunction with the drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily enforce the technical concept of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device according to the present disclosure will be described below with reference to the accompanying drawings through exemplary embodiments.

FIG. 1 is a block diagram exemplarily showing a data storage device in accordance with an embodiment of the present disclosure. A data storage device 100 may operate in response to a request from a host device (not shown) such as a mobile phone, an MP3 player, a digital camera, a laptop computer, a desktop computer, a game player, a TV, and a car entertainment system. The data storage device 100 may store data to be accessed by the host device. The data storage device 100 may also be referred to as a memory system.

The data storage device 100 may be manufactured as any one of various kinds of storage devices based on the protocol of an interface (I/F) for communication with the host device. For example, the data storage device 100 may be configured as any one of various kinds of storage devices such as a solid state drive, a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a personal computer memory card international association (PCMCIA) memory card, a peripheral component interconnection (PCI) memory card, a PCI express (PCI-E) memory card, a compact flash (CF) card, a smart media card, a memory stick, and so forth.

Referring to FIG. 1, the data storage device 100 may include a controller 110 and a nonvolatile memory device 160.

The controller 110 may control the nonvolatile memory device 160 in response to a request from the host device. For Jo example, the controller 110 may provide the data read from the nonvolatile memory device 160 to the host device. Also, the controller 110 may store the data provided from the host device, in the nonvolatile memory device 160. For these operations, the controller 110 may control the read, write (or program) and erase operations of the nonvolatile memory device 160.

The nonvolatile memory device 160 may operate as the storage medium of the data storage device 100. Hereinbelow, the nonvolatile memory device 160 constituted by a NAND type flash memory device (hereinafter, referred to as a flash memory device) will be explained. However, it will be appreciated that the nonvolatile memory device 160 may be constituted by any one of various types of nonvolatile memory devices such as a NOR type flash memory device, a ferroelectric random access memory (FRAM) using ferroelectric capacitors, a magnetic random access memory (MRAM) using a tunneling magneto-resistive (TMR) layer, a phase change random access memory (PRAM) using a chalcogenide, and a resistive random access memory (ReRAM) using a transition metal oxide. The nonvolatile memory device 160 may be constituted by a combination of a NAND type flash memory device and one or more of the various types of nonvolatile memory devices described above.

The controller 110 may drive a firmware (or software) for controlling the general operations of the data storage device 100. The flash memory device 160 may perform a read or program operation on a page basis (on each page) due to the structural characteristics thereof. Further, the flash memory device 160 may perform an erase operation on a block basis due to the structural characteristics thereof. It may be difficult for the flash memory device 160 to perform overwriting, due to the structural characteristics thereof. Because of such characteristics of the flash memory device 160, the controller 110 may drive an additional firmware or software which is referred to as a flash translation layer (FTL).

The controller 110 may include a control unit 120, a memory interface 130, an error correction code (ECC) unit (hereinafter, referred to as an ECC unit) 140, and a clock unit 150. While not shown, the controller 110 may further include function blocks such as a host interface, a working memory device and a power supply unit.

The control unit 120 may control the general operations of the controller 110 through driving of a firmware or software which is loaded on a working memory device (not shown). The control unit 120 may decode and drive a code type algorithm such as a firmware or software. The control unit 120 may be realized as hardware or a combined type of hardware and software. The control unit 120 may include a micro control unit (MCU) and a central processing unit (CPU).

The memory interface 130 and the flash memory device 160 may be coupled through channels CH. The channels CH may be physical paths for transmitting control signals or data between the memory interface 130 and the flash memory device 160. The channels CH may be constituted by control signal lines CSLs for transmitting control signals and data lines DTLs for transmitting data.

The memory interface 130 may control the flash memory device 160 under the control of the control unit 120. That is to say, the memory interface 130 may interface the controller 110 and the flash memory device 160 through the channels CH. For example, the memory interface 130 may provide control signals for controlling the flash memory device 160 to the flash memory device 160. In response to the control signals provided through the memory interface 130, commands and addresses may be provided to the flash memory device 160. The memory interface 130 may exchange data with the flash memory device 160.

The ECC unit 140 may detect and to correct an error of the data read from the flash memory devices 160. The ECC unit 140 may be realized as any one type of hardware and software. Otherwise, the ECC unit 140 may be realized as a combined type of hardware and software.

The ECC unit 140 may perform an ECC encoding operation for data to be stored in the flash memory device 160. For example, the ECC unit 140 may perform an arithmetic operation based on an ECC encoding algorithm for data to be stored in the flash memory device 160, and generate parity data. Also, the ECC unit 140 may perform an ECC decoding operation for the data read from the flash memory device 160 and the parity data. For example, the ECC unit 140 may perform an arithmetic operation based on an ECC decoding algorithm for the data read from the flash memory device 160 and the parity data, detect an error included in the read data, and correct the detected error.

The clock unit 150 may generate clocks which are to be used in the controller 110, and provide the generated clocks. The clocks generated by the clock unit 150 may be used as the operating clocks of the function blocks (for example, the control unit 120, the memory interface 130 and the ECC unit 140) included in the controller 110.

The clock unit 150 may control a clock CLK_ECC which is to be provided to the ECC unit 140, based on monitoring information MNT. The monitoring information MNT may mean information which is acquired by monitoring the operation of the memory interface 130. The monitoring Information MNT may mean information which is acquired by monitoring the control signals transmitted from the memory interface 130 to the flash memory device 160 through the control signal lines CSLs. The clock unit 150 may control the clock CLK_ECC which is to be provided to the ECC unit 140, based on a result of analyzing the monitoring information MNT. The configuration and operations of the clock unit 150 will be described below in detail with reference to FIGS. 2 and 3.

Figure 2:
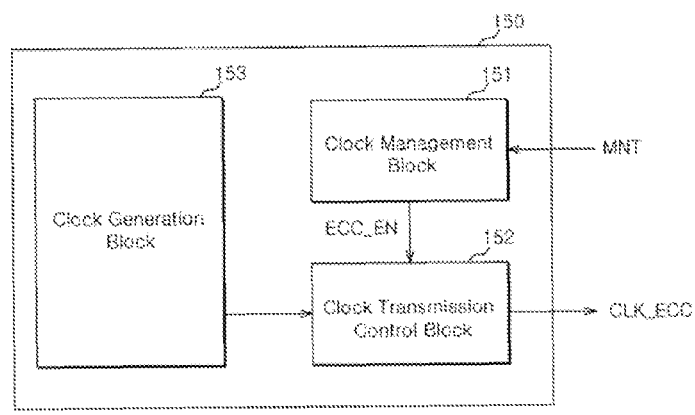
FIG. 2 is a block diagram exemplarily showing a clock unit of FIG. 1.

FIG. 2 is a block diagram exemplarily showing the clock unit 150 of FIG. 1. Referring to FIG. 2, the clock unit 150 may include a clock management block 151, a clock transmission control block 152, and a clock generation block 153. Hereinbelow, the clock unit 150 will be described in detail with reference to FIGS. 1 and 2.

The clock management block 151 may acquire/obtain the monitoring information MNT. The clock management block 151 may acquire the monitoring information MNT by monitoring the operation of the memory interface 130. For example, the clock management block 151 may acquire the monitoring information MNT by referring to a descriptor which clearly states operations to be performed by the memory interface 130 for the control of the flash memory device 160. The descriptor may mean a job order which is provided from the control unit 120 to the memory interface 130. For another example, the clock management block 151 may acquire the monitoring information MNT by monitoring the control signals transmitted from the memory interface 130 to the flash memory device 160.

The clock management block 151 may analyze and determine the acquired monitoring information MNT. For example, the clock management block 151 may determine whether a read command is transmitted from the memory interface 130 to the flash memory device 160, based on the acquired monitoring information MNT. Further, the clock management block 151 may determine whether the transmitted read command is a read command for reading the data stored in the flash memory device 160.

The clock management block 151 may control the clock CLK_ECC which is to be provided to the ECC unit 140, based on a determination result. For example, in the case where it is determined through the monitoring information MNT that a read command for reading the data stored in the flash memory device 160 is transmitted, the clock management block 151 may provide an activated clock transmission control signal ECC_EN to the clock transmission control block 152. In other words, the clock management block 151 may provide the activated clock transmission control signal ECC_EN to the clock transmission control block 152 while the flash memory device 160 performs a read operation in response to the transmitted read command.

The clock generation block 153 may generate clocks which are to be provided to the internal function blocks (for example, the control unit 120, the memory interface 130 and the ECC unit 140) of the controller 110. The clock generation block 153 may include a clock generator.

The clock transmission control block 152 may control the transmission of the clocks generated from the clock generation block 153. The clock transmission control block 152 may transmit the clocks to the internal function blocks or not in response to the clock transmission control signal ECC_EN provided from the clock management block 151. Namely, the clock transmission control block 152 may perform a switching operation for the transmission of the clocks between the clock generation block 153 and the internal function blocks. For example, the clock transmission control block 152 may transmit the clock CLK_ECC to the ECC unit 140 in response to the activated clock transmission control signal ECC_EN. Also, the clock transmission control block 152 may block clock transmission to the ECC unit 140 in response to a deactivated clock transmission control signal ECC_EN.

Figure 3:
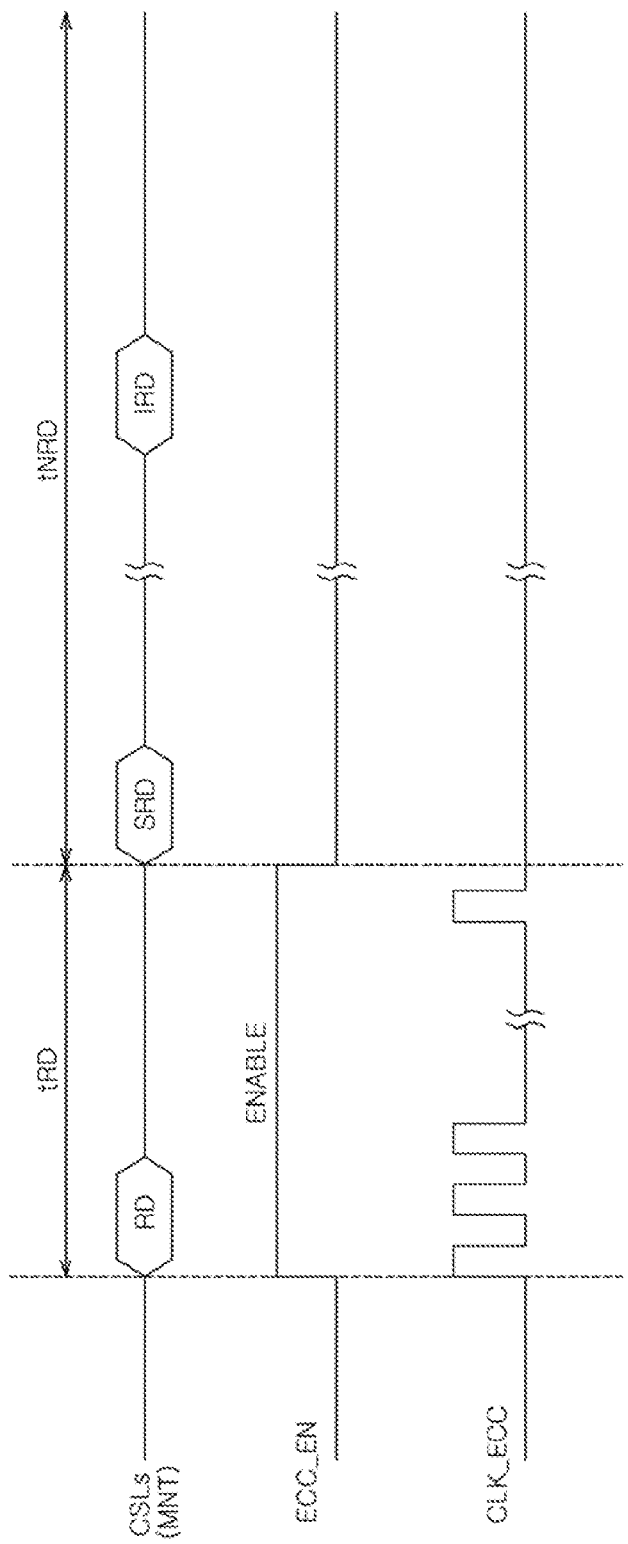
FIG. 3 is a timing diagram exemplarily explaining a clock providing operation of the clock unit shown in FIG. 2.

FIG. 3 is a timing diagram explaining the clock providing operation of the clock unit 150 shown in FIG. 2. Hereinbelow, with reference to FIGS. 2 and 3, the operations of the clock unit 150 will be described in detail in the case where a read operation for reading the data stored in the flash memory device 160 is performed and in the case where a read operation for reading others irrelevant to the data stored in the flash memory device 160 is performed.

In a period tRD of FIG. 3, the read operation for reading the data stored in the flash memory device 160 is performed. In a remaining period tNRD, the read operation irrelevant to the data stored in the flash memory device 160 is performed. For instance, the read operation irrelevant to the data stored in the flash memory device 160 may include a read operation for checking an operating state of the flash memory device 160 in response to a state read command SRD. For another instance, the read operation irrelevant to the data stored in the flash memory device 160 may include a read operation for checking the identity (ID) of the flash memory device 160 in response to an ID read command IRD.

During the period tRD, the clock management block 151 may acquire the monitoring information MNT. During the period tRD, the memory interface 130 may perform a control operation for controlling the read operation of the flash memory device 160. The clock management block 151 may acquire the monitoring information MNT by referring to the descriptor of the memory interface 130 for controlling the read operation. During the period tRD, control signals (i.e. a read command RD) may be transmitted from the memory interface 130 to the flash memory device 160 through the control signal lines CSLs. The clock management block 151 may acquire the monitoring information MNT by sensing such a read command RD.

The clock management block 151 may activate or deactivate the clock transmission control signal ECC_EN based on a result of analyzing and determining the acquired monitoring information MNT. When the read operation of the flash memory device 160 is performed, the ECC unit 140 may operate to correct an error included in read data. Accordingly, during the period tRD, the clock management block 151 may activate the clock transmission control signal ECC_EN. The clock transmission control block 152 may transmit the clock CLK_ECC to the ECC unit 140 in response to the activated clock transmission control signal ECC_EN.

When the read operation irrelevant to the data stored in the flash memory device 160 is performed, the operation of the ECC unit 140 may not be necessary. Therefore, during the period tNRD, the clock management block 151 may deactivate the clock transmission control signal ECC_EN. The clock transmission control block 152 may not transmit the clock CLK_ECC to the ECC unit 140 in response to the deactivated clock transmission control signal ECC_EN. That is to say, the clock transmission control block 152 may block clock Jo transmission to the ECC unit 140 in response to the deactivated clock transmission control signal ECC_EN.

Through these operations, in the read operation in which the data stored in the flash memory device 160 are outputted, the clock CLK_ECC may be provided to the ECC unit 140. Further, in the read operation in which the data stored in the flash memory device 160 are not outputted, the clock CLK_ECC may not be provided to the ECC unit 140. In other words, the clock CLK_ECC may be provided to the ECC unit 140 during only a period in which data stored in the flash memory device 160 are actually outputted. Because the clock CLK_ECC may be selectively provided to the ECC unit 140 depending on whether the data stored in the flash memory device 160 are outputted or not, the power consumption of the controller 110 may be reduced.

Figure 4:
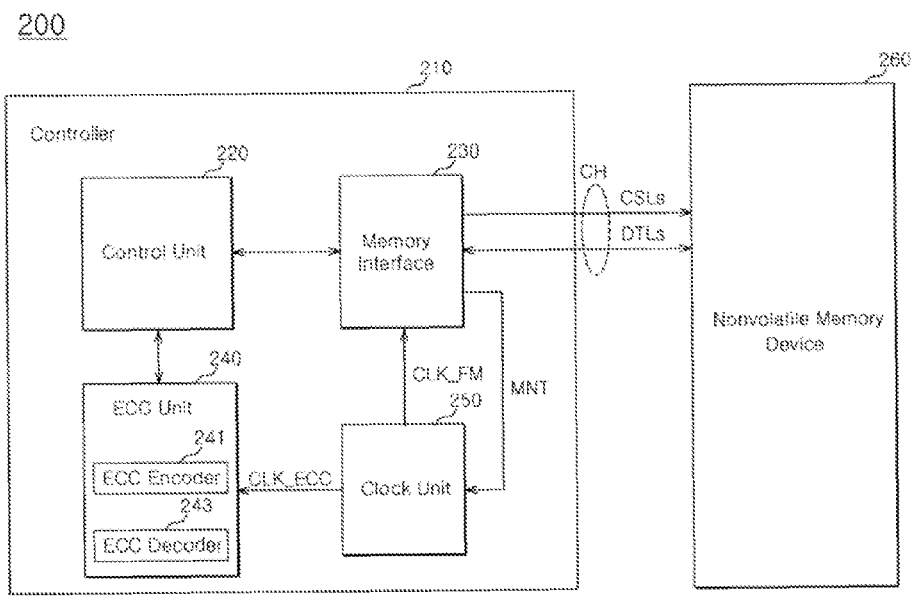
FIG. 4 is a block diagram exemplarily showing a data storage device in accordance with an embodiment of the present disclosure.

FIG. 4 is a block diagram exemplarily showing a data storage device in accordance with another embodiment of the present disclosure. Referring to FIG. 4, a data storage device 200 may include a controller 210 and a nonvolatile memory device 260. Like the data storage device 100 of FIG. 1, in the data storage device 200, since clocks CLK_ECC and CLK_FM may be selectively provided based on the Information acquired by monitoring the operation of a memory interface 230 or by monitoring the control signals transmitted from the memory interface 230, the power consumption of the controller 210 may be reduced.

The controller 210 may control the nonvolatile memory device 260 in response to a request from the host device. For example, the controller 210 may provide the data read from the nonvolatile memory device 260 to the host device. Also, the controller 210 may store the data provided from the host device in the nonvolatile memory device 260. For these operations, the controller 210 may control the read, write (or program), and erase operations of the nonvolatile memory device 260.

The nonvolatile memory device 260 may operate as the storage medium of the data storage device 200. Hereinbelow, the nonvolatile memory device 260 constituted by a NAND type flash memory device (hereinafter, referred to as a flash memory device) will be explained. However, it will be appreciated that the nonvolatile memory device 260 may be constituted by any one of various types of nonvolatile memory devices such as a NOR type flash memory device, a ferroelectric random access memory (FRAM) using ferroelectric capacitors, a magnetic random access memory (MRAM) using a tunneling magneto-resistive (TMR) layer, a phase change random access memory (PRAM) using a chalcogenide, and a resistive random access memory (ReRAM) using a transition metal oxide. The nonvolatile memory device 260 may be constituted by a combination of a NAND type flash memory device and one or more of the various types of nonvolatile memory devices described above.

The controller 210 may drive a firmware (or software) for controlling the general operations of the data storage device 200. The flash memory device 260 may perform a read or program operation on a page basis (on each page) due to the structural characteristics thereof. Further, the flash memory device 260 may perform an erase operation on a block basis due to the structural characteristics thereof. It may be difficult for the flash memory device 260 to perform overwriting, due to the structural characteristics thereof. Because of such characteristics of the flash memory device 260, the controller 210 may drive an additional firmware or software which is referred to as a flash translation layer (FTL).

The controller 210 may include a control unit 220, the memory interface 230, an error correction code (ECC) unit (hereinafter, referred to as an ECC unit) 240, and a clock unit 250. While not shown, the controller 210 may further include function blocks such as a host interface, a working memory device and a power supply unit.

The control unit 220 may control the general operations of the controller 210 through driving of a firmware or software which is loaded on a working memory device (not shown). The control unit 220 may decode and drive a code type algorithm such as a firmware or software. The control unit 220 may be realized as hardware or a combined type of hardware and software. The control unit 220 may include a micro control unit (MCU) and a central processing unit (CPU).

The memory interface 230 and the flash memory device 260 may be coupled through channels CH. The channels CH may be physical paths for transmitting control signals or data between the memory interface 230 and the flash memory device 260. The channels CH may be constituted by control signal lines CSLs for transmitting control signals and data lines DTLs for transmitting data.

The memory interface 230 may control the flash memory device 260 under the control of the control unit 220. That is to say, the memory interface 230 may interface the controller 210 and the flash memory device 260 through the channels CH. For example, the memory interface 230 may provide control signals for controlling the flash memory device 260 to the flash memory device 260. In response to the control signals provided through the memory interface 230, commands and addresses may be provided to the flash memory device 260. The memory interface 230 may exchange data with the flash memory device 260.

The ECC unit 240 may detect and correct an error of the data read from the flash memory devices 260. The ECC unit 240 may be realized as any one type of hardware and software. Otherwise, the ECC unit 240 may be realized as a combined type of hardware and software.

The ECC unit 240 may perform an ECC encoding operation for data to be stored in the flash memory device 260. For example, the ECC unit 240 may perform an arithmetic operation based on an ECC encoding algorithm, for data to be stored in the flash memory device 260, and generate parity data. To this end, the ECC unit 240 may include an ECC encoder 241. Also, the ECC unit 240 may perform an ECC decoding operation for the data read from the flash memory device 260 and the parity data. For example, the ECC unit 240 may perform an arithmetic operation based on an ECC decoding algorithm for the data read from the flash memory device 260 and the parity data, detect an error included in the read data, and correct the detected error. To this end, the ECC unit 240 may include an ECC decoder 243.

The clock unit 250 may generate clocks which are to be used in the controller 210, and provide the generated clocks. The clocks generated by the clock unit 250 may be used as the operating clocks of the function blocks (for example, the control unit 220, the memory interface 230 and the ECC unit 240) included in the controller 210.

The clock unit 250 may control clocks CLK_FM and CLK_ECC which are to be provided to the memory interface 230 and the ECC unit 240, based on monitoring information MNT. The monitoring information MNT may mean information which is acquired by monitoring the operation of the memory interface 230. The monitoring information MNT may mean information which is acquired by monitoring the control signals transmitted from the memory interface 230 to the flash memory device 260 through the control signal lines CSLs. The clock unit 250 may control the clocks CLK_FM and CLK_ECC which are to be provided to the memory interface 230 and the ECC unit 240, based on a result of analyzing the monitoring information MNT. The configuration and operations of the clock unit 250 will be described below in detail with reference to FIGS. 5 and 6.

Figure 5:
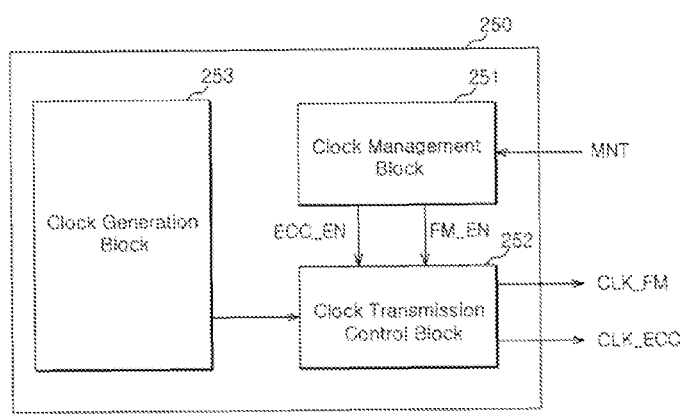
FIG. 5 is a block diagram exemplarily showing a clock unit of FIG. 4.

FIG. 5 is a block diagram exemplarily showing the clock unit 250 of FIG. 4. Referring to FIG. 5, the clock unit 250 may include a clock management block 251, a clock transmission control block 252, and a clock generation block 253. Hereinbelow, the clock unit 250 will be described in detail with reference to FIGS. 4 and 5.

The clock management block 251 may acquire/obtain the monitoring information MNT. The clock management block 251 may acquire the monitoring information MNT by monitoring the operation of the memory interface 230. For example, the clock management block 251 may acquire the monitoring information MNT by referring to a descriptor which clearly states operations to be performed by the memory interface 230 for the control of the flash memory device 260. The descriptor may mean a job order which is provided from the control unit 220 to the memory interface 230. For another example, the clock management block 251 may acquire the monitoring information MNT by monitoring the control signals transmitted from the memory interface 230 to the flash memory device 260.

The clock management block 251 may analyze and determine the acquired monitoring information MNT. For example, the clock management block 251 may determine whether the memory interface 230 controls (or expects to control) the flash memory device 260 based on the acquired monitoring information MNT. In the case where the memory interface 230 controls the flash memory device 260 or expects to control the flash memory device 260, the flash memory device 260 may operate in a normal state (or in an activated state). In the other cases, the flash memory device 260 may operate in an idle state (a standby state, a power-saving state or a deactivated state).

The clock management block 251 may control the clock CLK_ECC which is to be provided to the ECC unit 240, based on a determination result. Also, the clock management block 251 may control the clock CLK_FM which is to be provided to the memory interface 230, based on the determination result.

For example, in the case where it is determined through the monitoring information MNT that the flash memory device 260 operates in the normal state, the clock management block 251 may provide activated clock transmission control signals ECC_EN and FM_EN to the clock transmission control block 252. Also, in the case where it is determined through the monitoring information MNT that the memory interface 230 controls the flash memory device 260 (or expects to control) the flash memory device 260, the clock management block 251 may provide the activated clock transmission control signals ECC_EN and FM_EN to the clock transmission control block 252. In other words, the clock management block 251 may provide the activated clock transmission control signals ECC_EN and FM_EN to the clock transmission control block 252 while the flash memory device 260 operates or expects to operate.

For another example, in the case where it is determined through the monitoring information MNT that the flash memory device 260 operates in the idle state, the clock management block 251 may provide deactivated clock transmission control signals ECC_EN and FM_EN to the clock transmission control block 252. Also, in the case where it is determined through the monitoring information MNT that the memory interface 230 does not control the flash memory device 260 or does not expect to control the flash memory device 260, the clock management block 251 may provide the deactivated clock transmission control signals ECC_EN and FM_EN to the clock transmission control block 252.

The clock generation block 253 may generate clocks which are to be provided to the internal function blocks (for example, the control unit 220, the memory interface 230 and the ECC unit 240) of the controller 210. Further, the clock generation block 253 may generate a reference clock CLK_FM which is used to generate control signals for controlling the flash memory device 260. The clock generation block 253 may include a clock generator.

The clock transmission control block 252 may control the transmission of the clocks generated from the clock generation block 253. The clock transmission control block 252 may transmit the clocks to the internal function blocks or not in response to the clock transmission control signals ECC_EN and FM_EN provided from the clock management block 251. Namely, the clock transmission control block 252 may perform a switching operation for the transmission of the clocks between the clock generation block 253 and the internal function blocks. For example, the clock transmission control block 252 may transmit the clock CLK_ECC to the ECC unit 240 in response to the activated clock transmission control signal ECC_EN. Also, the clock transmission control block 252 may transmit the clock CLK_FM to the memory interface 230 in response to the activated clock transmission control signal FM_EN. On the contrary, the clock transmission control block 252 may block clock transmission to the ECC unit 240 in response to a deactivated clock transmission control signal ECC_EN. Also, the clock transmission control block 252 may block clock transmission to the memory interface 230 in response to a deactivated clock transmission control signal FM_EN.

Figure 6:
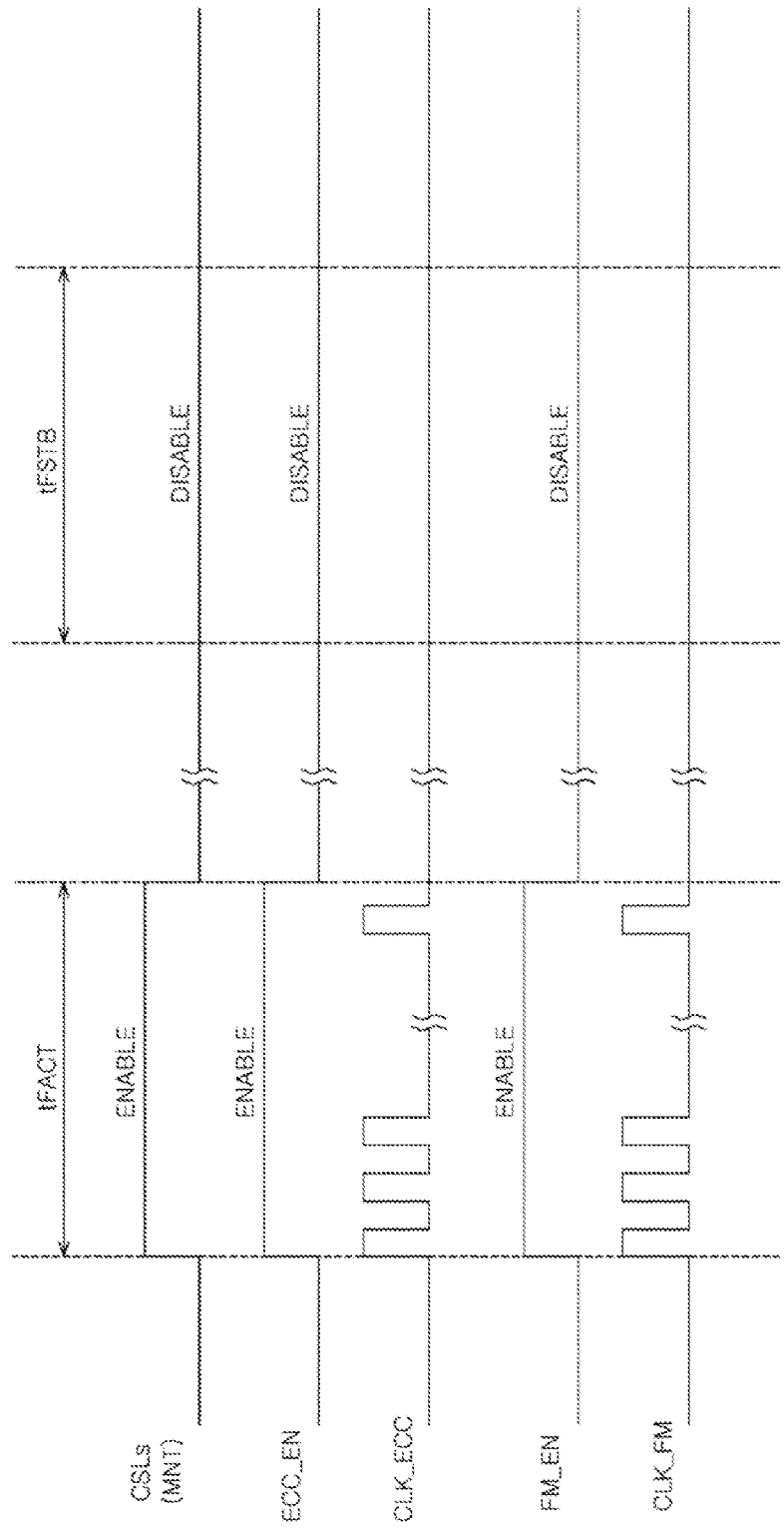
FIG. 6 is a timing diagram exemplarily explaining a clock providing operation of the clock unit shown in FIG. 5.

FIG. 6 is a timing diagram explaining the clock providing operation of the clock unit 250 shown in FIG. 5. Hereinbelow, with reference to FIGS. 5 and 6, the operations of the clock unit 250 will be described in detail in the case where the flash memory device 260 operates and in the case where the flash memory device 260 does not operate.

In a period tFACT of FIG. 6, the flash memory device 260 operates in the normal state. In a period tFSTB, the flash memory device 260 operates in the idle state. For instance, the idle state may include a state in which the flash memory device 260 is free from the control of the memory interface 230 (that is, a state in which the control signals transmitted through the control signal lines CSLs are deactivated as shown in FIG. 6), and a state in which the flash memory device 260 does not internally perform any particular operation, etc.

During the period tFACT, the clock management block 251 may acquire the monitoring information MNT. During the period tFACT, the memory interface 230 may perform a control operation for the flash memory device 260 to operate. The clock management block 251 may acquire the monitoring information MNT by monitoring the operation of the memory interface 230. For example, during the period tFACT, the clock management block 251 may acquire the monitoring information MNT through the descriptor or through sensing activated control signals.

The clock management block 251 may activate or deactivate the clock transmission control signals ECC_EN and FM_EN based on a result of analyzing and determining the acquired monitoring information MNT. In the case where the flash memory device 260 operates or expects to operate (that is, it operates in the normal state), the ECC unit 240 may use the clock CLK_ECC to detect and correct the operation of the flash memory device 260. Further, in the case where the flash memory device 260 operates or expects to operate (that is, it operates in the normal state), the memory interface 230 may use the reference clock CLK_FM to generate the control signals for controlling the flash memory device 260. Accordingly, during the period tFACT, the clock management block 251 may activate the clock transmission control signals ECC_EN and FM_EN. The clock transmission control block 252 may transmit the clock CLK_ECC to the ECC unit 240 in response to the activated clock transmission control signal ECC_EN. Also, the clock transmission control block 252 may transmit the reference clock CLK_FM to the memory interface 230 in response to the activated clock transmission control signal FM_EN.

In the case where the flash memory device 260 does not operate (that is, it operates in the idle state), the ECC unit 240 (for example, the ECC encoder 241 and the ECC decoder 243) may not need to operate. Further, in the case where the flash memory device 260 does not operate (that is, it operates in the idle state), the memory interface 230 may not need to generate the control signals for controlling the flash memory device 260. Therefore, during the period tFSTB, the clock management block 251 may deactivate the clock transmission control signals ECC_EN and FM_EN. The clock transmission control block 252 may not transmit the clock CLK_ECC to the ECC unit 240 in response to the deactivated clock transmission control signal ECC_EN. That is to say, the clock transmission control block 252 may block clock transmission to the ECC unit 240 in response to the deactivated clock transmission control signal ECC_EN. Moreover, the clock transmission control block 252 may not transmit the reference clock CLK_FM to the memory interface 230 in response to the deactivated clock transmission control signal FM_EN. That is to say, the clock transmission control block 252 may block clock transmission to the memory interface 230 in response to the deactivated clock transmission control signal FM_EN.

Through these operations, while the flash memory device 260 operates in the normal state, the clock CLK_ECC may be provided to the ECC unit 240. Further, the reference clock CLK_FM used to generate the control signals for controlling the flash memory device 260 may be provided to the memory interface 230. While the flash memory device 260 operates in the idle state, the clock CLK_ECC may not be provided to the ECC unit 240. In other words, while the flash memory device 260 operates in the idle state, the clock CLK_ECC may not be provided to the ECC encoder 241 and the ECC decoder 243. Further, the reference clock CLK_FM used to generate the control signals for controlling the flash memory device 260 may not be provided to the memory interface 230. As a consequence, the clocks CLK_ECC and CLK_FM may be provided only while the flash memory device 260 operates. Because the clocks CLK_ECC and CLK_FM may be selectively provided depending on the operating states of the flash memory device 260, the power consumption of the controller 210 may be reduced.

Figure 7:
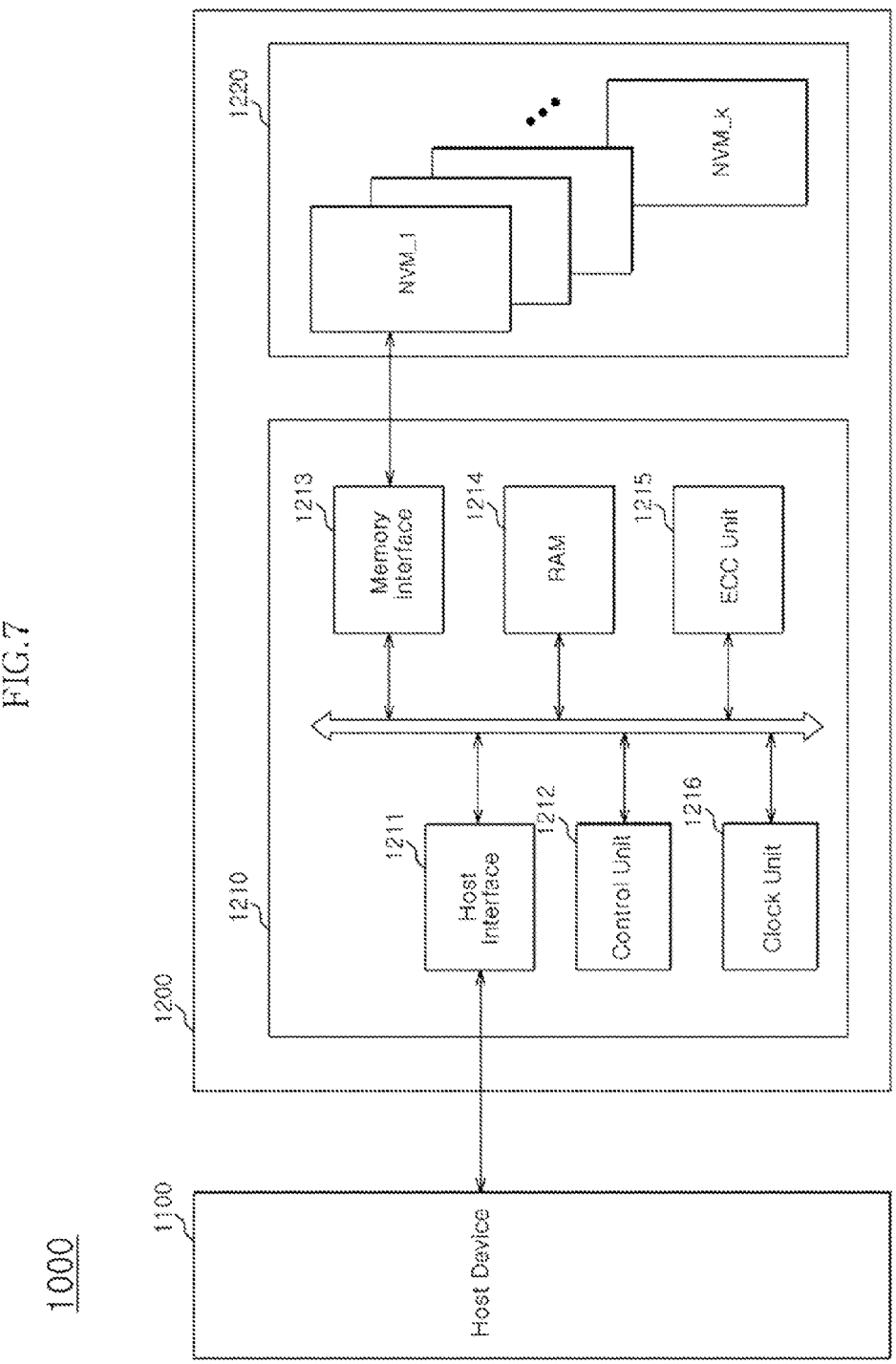
FIG. 7 is a block diagram exemplarily showing a data processing system which includes the data storage device in accordance with the embodiment of the present disclosure.

FIG. 7 is a block diagram showing a data processing system which includes the data storage device in accordance with the embodiment of the present disclosure. Referring to FIG. 7, a data processing system 1000 may include a host device 1100 and a data storage device 1200.

The data storage device 1200 may include a controller 1210, and a nonvolatile memory device 1220. The data storage device 1200 may be used by being electrically coupled to the host device 1100 such as a desktop computer, a laptop computer, a digital camera, a mobile phone, an MP3 player, a game player, and so forth. The data storage device 1200 is also referred to as a memory system.

The controller 1210 may access the nonvolatile memory device 1220 in response to a request from the host device 1100. For example, the controller 1210 may control the read, program or erase operation of the nonvolatile memory device 1220. The controller 1210 may drive a firmware or software for controlling the nonvolatile memory device 1220.

The controller 1210 may include a host interface 1211, a control unit 1212, a memory interface 1213, a RAM 1214, an error correction code (ECC) unit 1215, and a clock unit 1216.

The control unit 1212 may control the general operations of the controller 1210 in response to a request from the host device 1100. The RAM 1214 may be used as the working memory of the control unit 1212. The RAM 1214 may temporarily store the data read from the nonvolatile memory device 1220 or the data provided from the host device 1100.

The host interface 1211 may interface the host device 1100 and the controller 1210. For example, the host Interface 1211 may communicate with the host device 1100 through one of various interface protocols such as a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface 1213 may Interface the controller 1210 and the nonvolatile memory device 1220. The memory interface 1213 may provide a command and an address to the nonvolatile memory device 1220. Furthermore, the memory interface 1213 may exchange data with the nonvolatile memory device 1220.

The error correction code unit 1215 may detect an error of the data read from the nonvolatile memory device 1220. Also, the error correction code unit 1215 may correct the detected error when the detected error falls within a correctable range. Meanwhile, the error correction code unit 1215 may be provided inside or outside the controller 1210 depending on the features of the memory system 1200.

The clock unit 1216 may generate clocks which are to be used in the controller 1210. The clocks generated by the clock unit 1216 may be used as the operating clocks of the function blocks (for example, the host interface 1211, the control unit 1212, the memory interface 1213 and the ECC unit 1215) included in the controller 1210. Like the clock unit 150 of FIG. 1, the clock unit 1216 may monitor the operation of the memory interface 1213 and may selectively provide a clock to the error correction code unit 1215 based on a monitoring result. Otherwise, like the clock unit 250 of FIG. 4, the clock unit 1216 may monitor the operation of the memory interface 1213, and may selectively provide clocks to the error correction code unit 1215 and the memory interface 1213 based on a monitoring result.

The controller 1210 and the nonvolatile memory device 1220 may be manufactured as any one of various data storage devices. For example, the controller 1210 and the memory device 1220 may be integrated into one semiconductor apparatus and may be manufactured as any one of a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) memory card, a compact flash (CF) card, a smart media card, and a memory stick.

Figure 8:
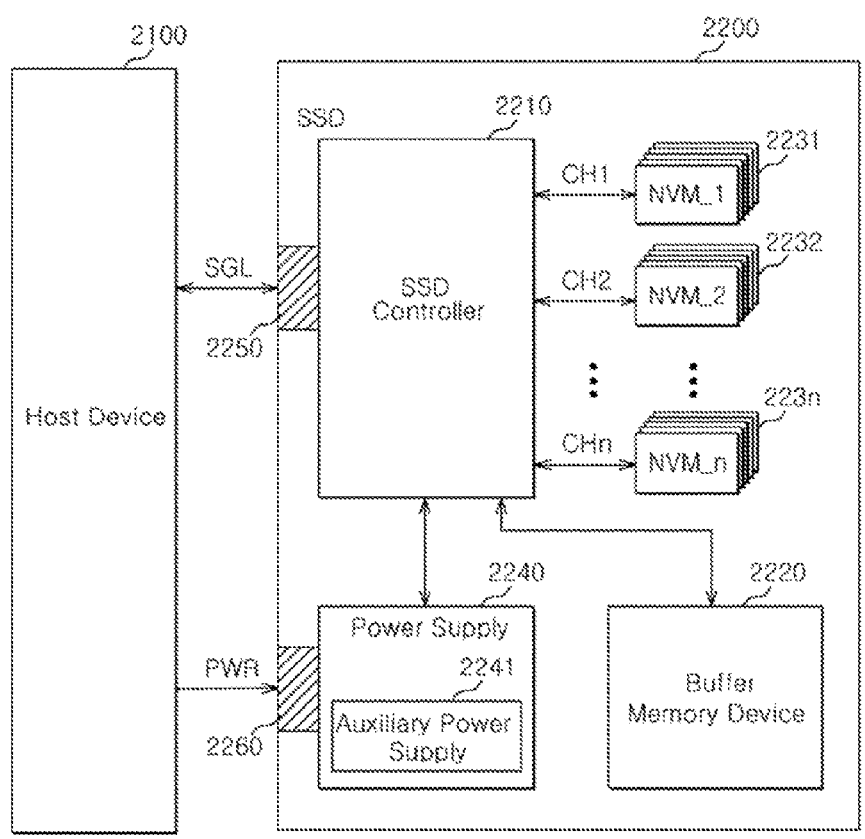
FIG. 8 is a block diagram exemplarily showing a data processing system which includes a solid state drive (SSD) in accordance with an embodiment of the present disclosure.

FIG. 8 is a block diagram exemplarily showing a data processing system which includes a solid state drive (SSD) in accordance with an embodiment of the present disclosure. Referring to FIG. 8, a data processing system 2000 may include a host device 2100 and an SSD 2200.

The SSD 2200 may include an SSD controller 2210, a buffer memory device 2220, nonvolatile memory devices 2231 to 223n, a power supply 2240, a signal connector 2250, and a power connector 2260.

The SSD 2200 may operate in response to a request from the host device 2100. That is to say, the SSD controller 2210 may access the nonvolatile memory devices 2231 to 223n in response to a request from the host device 2100. For example, the SSD controller 2210 may control the read, program, and erase operations of the nonvolatile memory devices 2231 to 223n.

The buffer memory device 2220 may temporarily store data which are to be stored in the nonvolatile memory devices 2231 to 223n. Further, the buffer memory device 2220 may temporarily store data which are read from the nonvolatile memory devices 2231 to 223n. The data temporarily stored in the buffer memory device 2220 may be transmitted to the host device 2100 or the nonvolatile memory devices 2231 to 223n under the control of the SSD controller 2210.

The nonvolatile memory devices 2231 to 223n may be used as storage media of the SSD 2200. The nonvolatile memory devices 2231 to 223n may be electrically coupled to the SSD controller 2210 through a plurality of channels CH1 to CHn, respectively. One or more nonvolatile memory devices may be electrically coupled to one channel. The nonvolatile memory devices electrically coupled to one channel may be electrically coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power so as to allow the SSD 2200 to be properly terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may be, for example, connectors of parallel advanced technology attachment (PATA), serial advanced technology attachment (SATA), small computer system interface (SCSI), serial attached SCSI (SAS), peripheral component interconnection (PCI), and PCI express (PCI-E), depending on an interface scheme between the host device 2100 and the SSD 2200.

Figure 9:
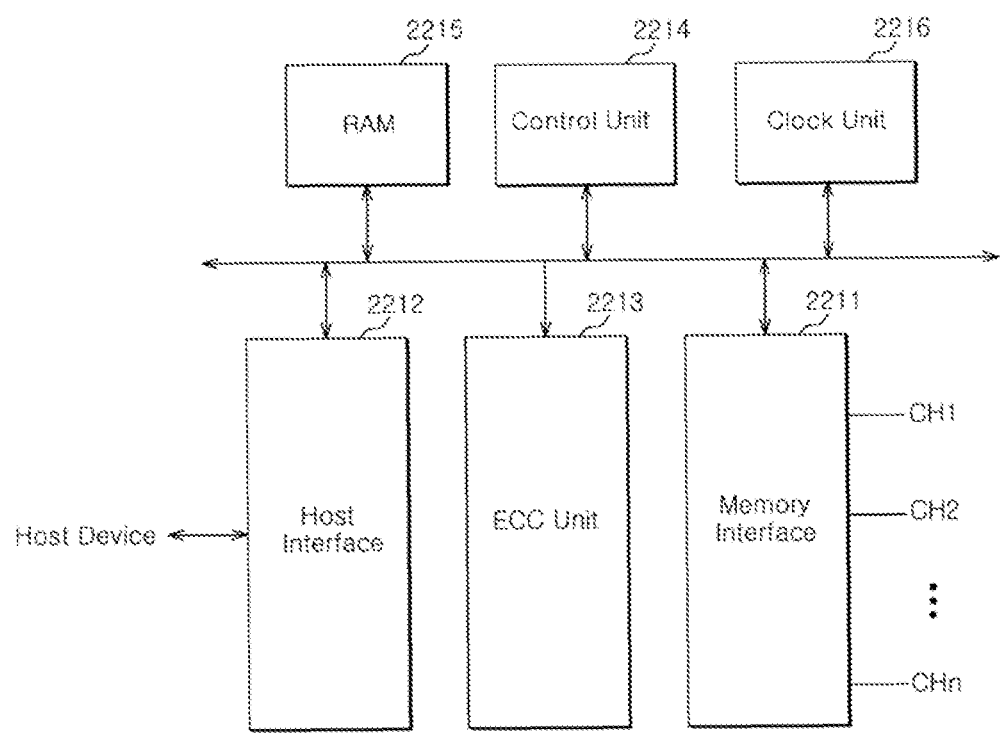
FIG. 9 is a block diagram exemplarily showing a SSD controller shown in FIG. 8.

FIG. 9 is a block diagram showing the SSD controller shown in FIG. 8. Referring to FIG. 9, the SSD controller 2210 includes a memory interface 2211, a host interface 2212, an ECC unit 2213, a control unit 2214, a RAM 2215, and a clock unit 2216.

The memory interface 2211 may provide a command and an address to the nonvolatile memory devices 2231 to 223n. Moreover, the memory interface 2211 may exchange data with the nonvolatile memory devices 2231 to 223n. The memory interface 2211 may distribute the data transmitted from the buffer memory device 2220 to the respective channels CH1 to CHn, under the control of the control unit 2214. Furthermore, the memory interface 2211 may transfer the data read from the nonvolatile memory devices 2231 to 223n to the buffer memory device 2220, under the control of the control unit 2214.

The host interface 2212 may provide an interface with the SSD 2200 in correspondence to the protocol of the host device 2100. For example, the host interface 2212 may communicate with the host device 2100 through one of parallel advanced technology attachment (PATA), serial advanced technology attachment (SATA), small computer system interface (SCSI), serial attached SCSI (SAS), peripheral component interconnection (PCI) and PCI express (PCI-E) protocols. In addition, the host interface 2212 may perform a disk emulating function of supporting the host device 2100 to recognize the SSD 2200 as a hard disk drive (HDD).

The ECC unit 2213 may generate parity bits based on the data transmitted to the nonvolatile memory devices 2231 to 223n. The generated parity bits may be stored in spare areas of the nonvolatile memory devices 2231 to 223n. The ECC unit 2213 may detect an error of the data read from the nonvolatile memory devices 2231 to 223n. When the detected error falls within a correctable range, the ECC unit 2213 may correct the detected error.

The control unit 2214 may analyze and process a signal SGL inputted from the host device 2100. The control unit 2214 may control the general operations of the SSD controller 2210 in response to a request from the host device 2100. The control unit 2214 may control the operations of the buffer memory device 2220 and the nonvolatile memory devices 2231 to 223n based on a firmware for driving the SSD 2200. The RAM 2215 may be used as a working memory device for driving the firmware.

Like the clock unit 150 of FIG. 1, the clock unit 2216 may monitor the operation of the memory Interface 2211 and may selectively provide a clock to the error correction code unit 2213 based on a monitoring result. Otherwise, like the clock unit 250 of FIG. 4, the clock unit 2216 may monitor the operation of the memory interface 2211, and may selectively provide clocks to the error correction code unit 2213 and the memory interface 2211 based on a monitoring result.

Figure 10:
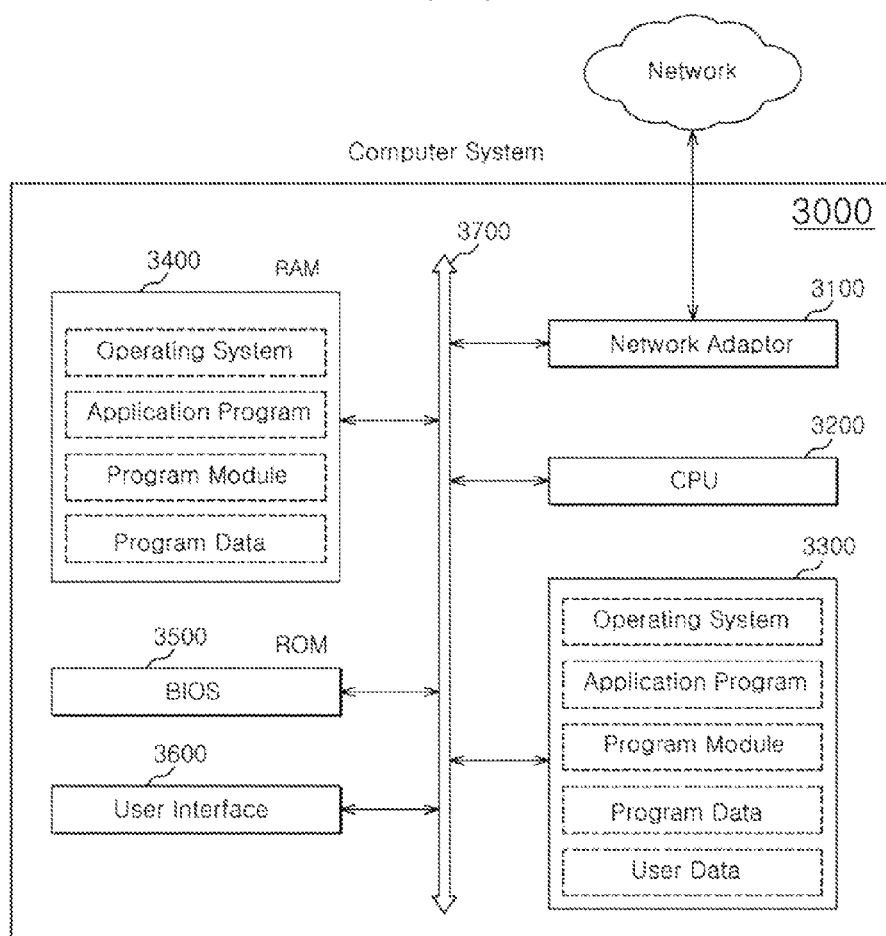
FIG. 10 is a block diagram exemplarily showing a computer system including the data storage device in accordance with the embodiment of the present disclosure.

FIG. 10 is a block diagram showing a computer system in which the data storage device in accordance with the embodiment of the present disclosure is mounted. Referring to FIG. 10, a computer system 3000 includes a network adaptor 3100, a central processing unit 3200, a data storage device 3300, a RAM 3400, a ROM 3500, and a user interface 3600, which are electrically coupled to a system bus 3700. The data storage device 3300 may be constituted by the data storage device 100 shown in FIG. 1, the data storage device 200 shown in FIG. 4, the data storage device 1200 shown in FIG. 7 or the SSD 2200 shown in FIG. 8.

The network adaptor 3100 provides the interface between the computer system 3000 and external networks. The central processing unit 3200 performs general operations for driving an operating system or an application program in the RAM 3400.

The data storage device 3300 stores general data necessary in the computer system 3000. For example, an operating system for driving the computer system 3000, an application program, various program modules, program data and user data are stored in the data storage device 3300.

The RAM 3400 may be used as a working memory device of the computer system 3000. Upon booting, the operating system, the application program, the various program modules, and the program data necessary for driving programs, which are read from the data storage device 3300, are loaded on the RAM 3400. BIOS (basic input/output system), which is activated before the operating system is driven, is stored in the ROM 3500. Information exchange between the computer system 3000 and a user is implemented through the user interface 3600.

Although not shown in a drawing, it is to be readily understood that the computer system 3000 may further include devices such as an application chipset, a camera image processor (CIS), and so forth.

While certain embodiments have been described above, it will be understood to those skilled in the art that the embodiments described are by way of example only. Accordingly, the data storage device described herein should not be limited based on the described embodiments. Rather, the data storage device described herein should only be limited in light of the claims that follow when taken in conjunction with the above description and accompanying drawings.

What is claimed is:

1. A data storage device comprising:
a nonvolatile memory device;
an error correction code unit suitable for detecting and correcting a data error read from the nonvolatile memory device in response to an operation clock; and
a clock unit suitable for selectively providing the operation clock to the error correction code unit depending on a type of a read operation, when the nonvolatile memory device outputs data by performing the read operation.

2. The data storage device according to claim 1, wherein the clock unit is suitable for providing the operation clock to the error correction code unit when the read operation is performed for reading user data stored in the nonvolatile memory device according to a request from a host.

3. The data storage device according to claim 1, wherein the clock unit is suitable for blocking the providing of the operation clock to the error correction code unit when the read operation is performed for checking an operating state of the nonvolatile memory device.

4. The data storage device according to claim 1, wherein the clock unit is suitable for blocking the providing of the operation clock to the error correction code unit when the read operation is performed for checking an identity (ID) of the nonvolatile memory device.

5. The data storage device according to claim 1, further comprising:
a memory interface suitable for providing control signals to the nonvolatile memory device, based on a descriptor, which states operations to be performed for controlling the nonvolatile memory device.

6. The data storage device according to claim 5, wherein the clock unit is suitable for selectively providing the operation clock to the error correction code unit, based on monitoring information obtained by monitoring an operation of the memory interface.

7. The data storage device according to claim 6, wherein the clock unit is suitable for obtaining the monitoring information through sensing of the control signals.

8. The data storage device according to claim 7, wherein the clock unit is suitable for providing the operation clock to the error correction code unit when a read command for reading the data stored in the nonvolatile memory device is transmitted from the memory interface to the nonvolatile memory device.

9. The data storage device according to claim 6, wherein the clock unit is suitable for obtaining the monitoring information by referring to the descriptor.

10. The data storage device according to claim 6, wherein the clock unit comprises:
a clock generation block suitable for generating the operation clock;
a clock management block suitable for monitoring the operation of the memory interface, and generating a clock transmission control signal based on the monitoring information obtained based on a monitoring result; and
a clock transmission control block suitable for transmitting the operation clock to the error correction code unit in response to the clock transmission control signal.

11. A data storage device comprising:
a nonvolatile memory device;
an error correction code unit suitable for detecting and correcting a data error read from the nonvolatile memory device in response to a first operation clock;
a memory interface suitable for providing control signals for controlling the nonvolatile memory device to the nonvolatile memory device in response to a second operation clock; and
a clock unit suitable for selectively providing the first and second operation clocks to the error correction code unit and the memory interface depending on an operating state of the nonvolatile memory device,
wherein the clock unit comprises:
a clock generation block suitable for generating the first and second operation clocks;
a clock management block suitable for monitoring an operation of the memory interface to obtain monitoring information, and generating a first clock transmission control signal and a second clock transmission control signal based on the monitoring information; and
a clock transmission control block suitable for transmitting the first operation clock to the error correction code unit when the first clock transmission control signal is activated, and transmitting the second operation clock to the memory interface when the second clock transmission control signal is activated.

12. The data storage device according to claim 11, wherein the clock unit is suitable for blocking the providing of the first and second operation clocks to the error correction code unit and the memory interface, while the nonvolatile memory device operates in an idle state.

13. The data storage device according to claim 12,
wherein the error correction code unit comprises an encoder which is suitable for encoding an error correction code for data to be stored in the nonvolatile memory device, and a decoder which is suitable for detecting and correcting the error of the data read from the nonvolatile memory device, and
wherein the first operation clock is blocked from both the encoder and the decoder when the clock unit blocks the providing of the first operation clock to the error correction code unit.

14. The data storage device according to claim 11, wherein the clock unit is suitable for transmitting the first and second operation clocks to the error correction code unit and the memory interface, while the nonvolatile memory device operates in a normal state.

15. The data storage device according to claim 11, wherein the clock management block is suitable for activating the first clock transmission control signal and the second clock transmission control signal based on the monitoring information obtained when the control signals are provided to the nonvolatile memory device.

16. The data storage device according to claim 11,
wherein the memory interface is suitable for providing the control signals to the nonvolatile memory device based on a descriptor which states operations to be performed for controlling the nonvolatile memory device, and
wherein the clock management block is suitable for obtaining the monitoring information by referring to the descriptor.

17. A memory system comprising:
a memory device suitable for storing data;
a controller suitable for providing control signals for controlling the memory device thereto, and detecting and correcting the data of the memory device, using an operation clock,
wherein the operation clock is selectively generated depending on a type of a read operation of the memory device.

18. The memory system according to claim 17, wherein the controller comprises:
an error correction code unit suitable for detecting and correcting a data error read from the memory device in response to a first operation clock;
a memory interface suitable for providing the control signals to the memory device based on the type of the read operation in response to a second operation clock; and
a clock unit suitable for selectively providing the first and second operation clocks to the error correction code unit and the memory interface depending on an operation of the memory interface.

\* \* \* \* \*